Figure 1:
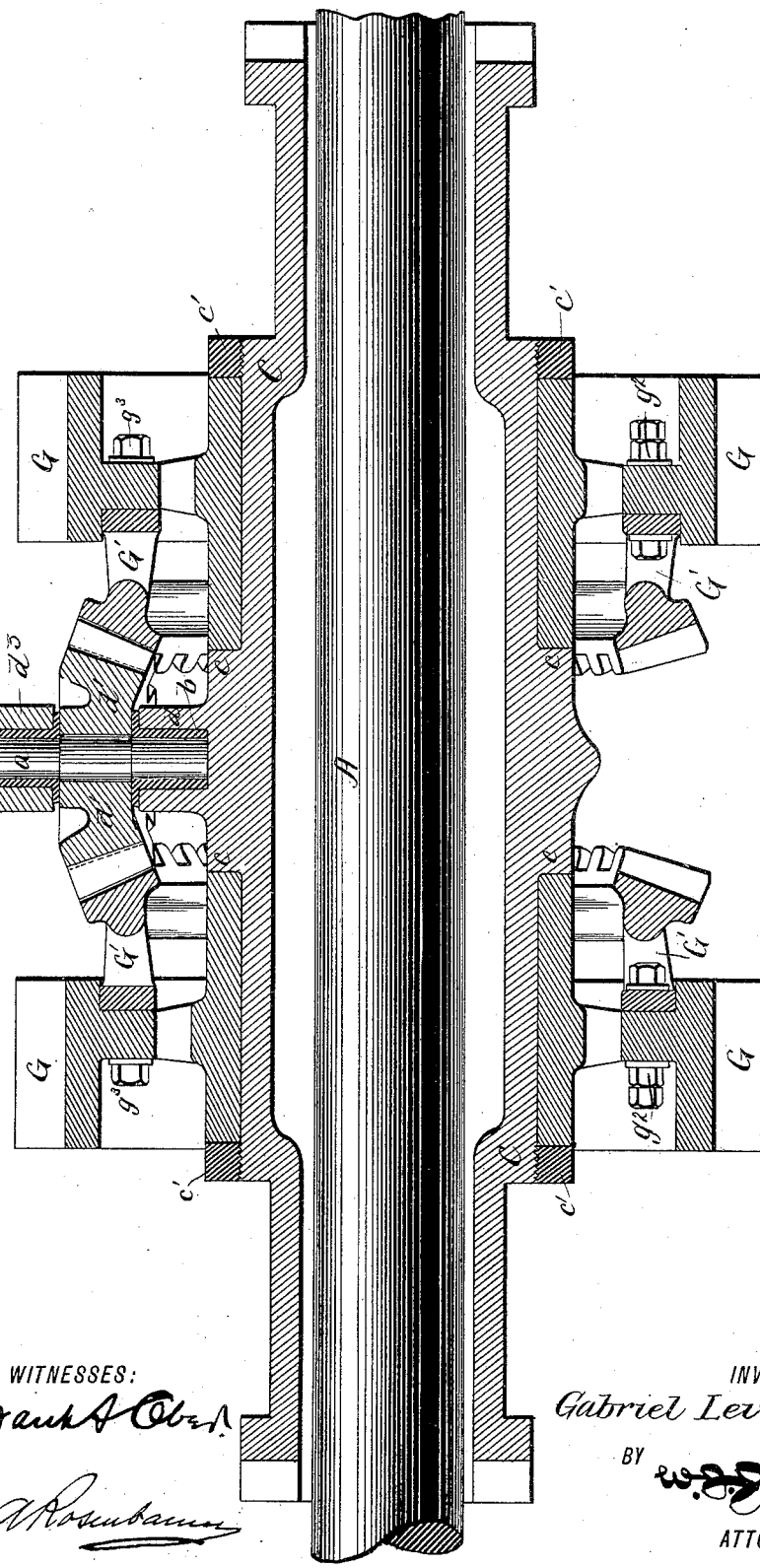

(No Model.) 7 Sheets—Sheet 1.

G. LEVERICH.
GEAR FOR DRIVING THE WINDING DRUMS OF CABLE RAILWAYS.

No. 430,660. Patented June 24, 1890.

WITNESSES:

INVENTOR
Gabriel Leverich
BY
ATTORNEY.

(No Model.) 7 Sheets—Sheet 2.

G. LEVERICH.
GEAR FOR DRIVING THE WINDING DRUMS OF CABLE RAILWAYS.

No. 430,660. Patented June 24, 1890.

WITNESSES:

INVENTOR
Gabriel Leverich
BY
ATTORNEY.

(No Model.)   7 Sheets—Sheet 3.
G. LEVERICH.
GEAR FOR DRIVING THE WINDING DRUMS OF CABLE RAILWAYS.
No. 430,660.   Patented June 24, 1890.
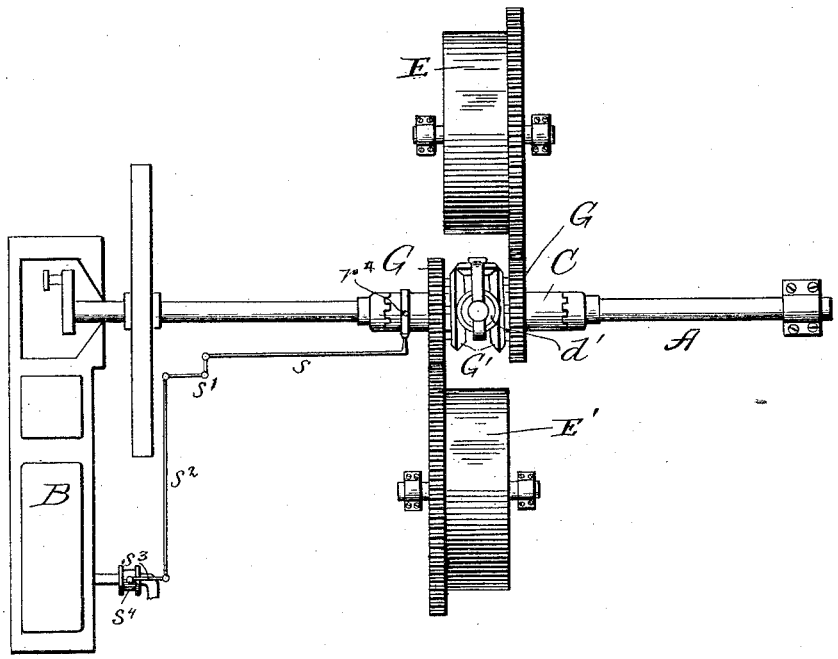
Fig. 3.
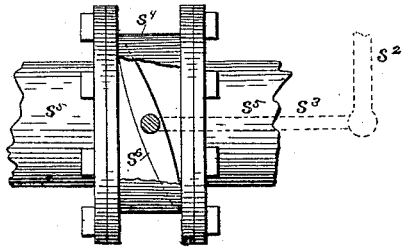
Fig. 3ª.
WITNESSES:
INVENTOR
Gabriel Leverich
BY
ATTORNEY.

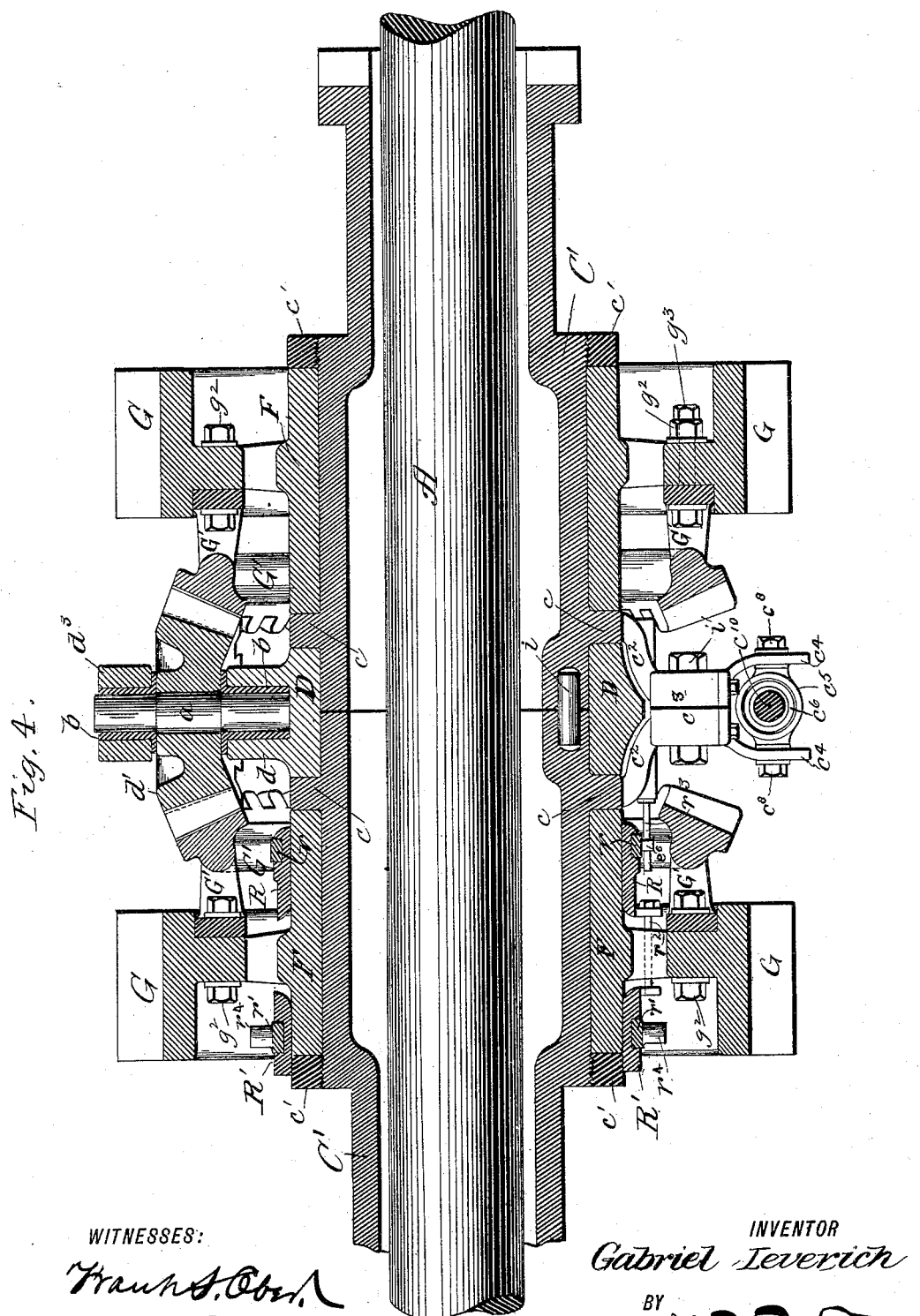

(No Model.) 7 Sheets—Sheet 5.
G. LEVERICH.
GEAR FOR DRIVING THE WINDING DRUMS OF CABLE RAILWAYS.
No. 430,660. Patented June 24, 1890.
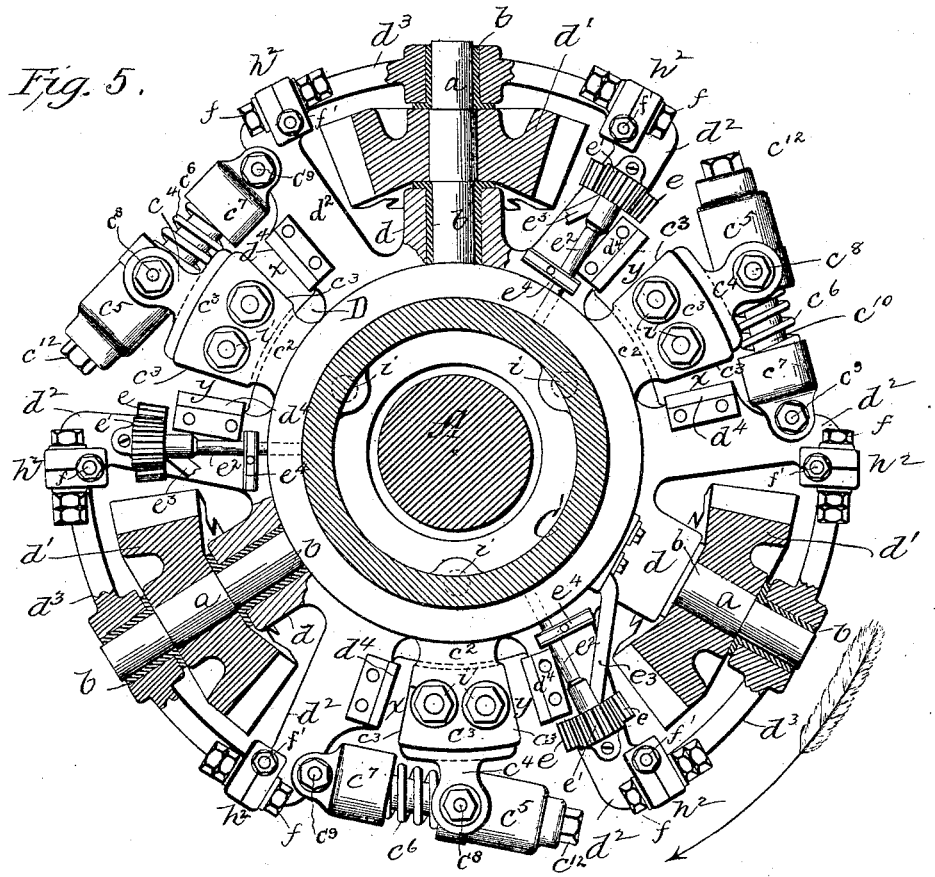
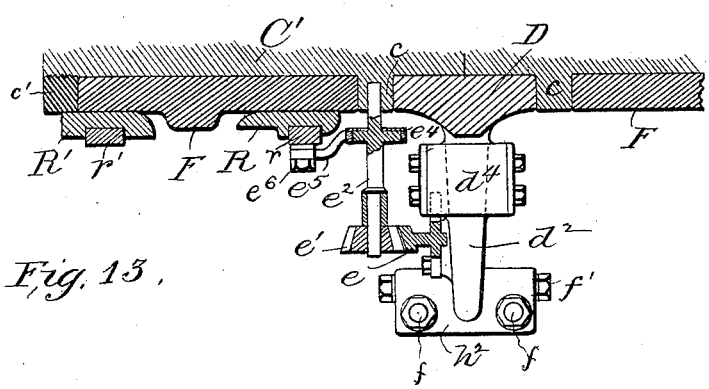
WITNESSES:
INVENTOR
Gabriel Leverich
BY
ATTORNEY (No Model.) 7 Sheets—Sheet 6.
G. LEVERICH.
GEAR FOR DRIVING THE WINDING DRUMS OF CABLE RAILWAYS.
No. 430,660. Patented June 24, 1890.
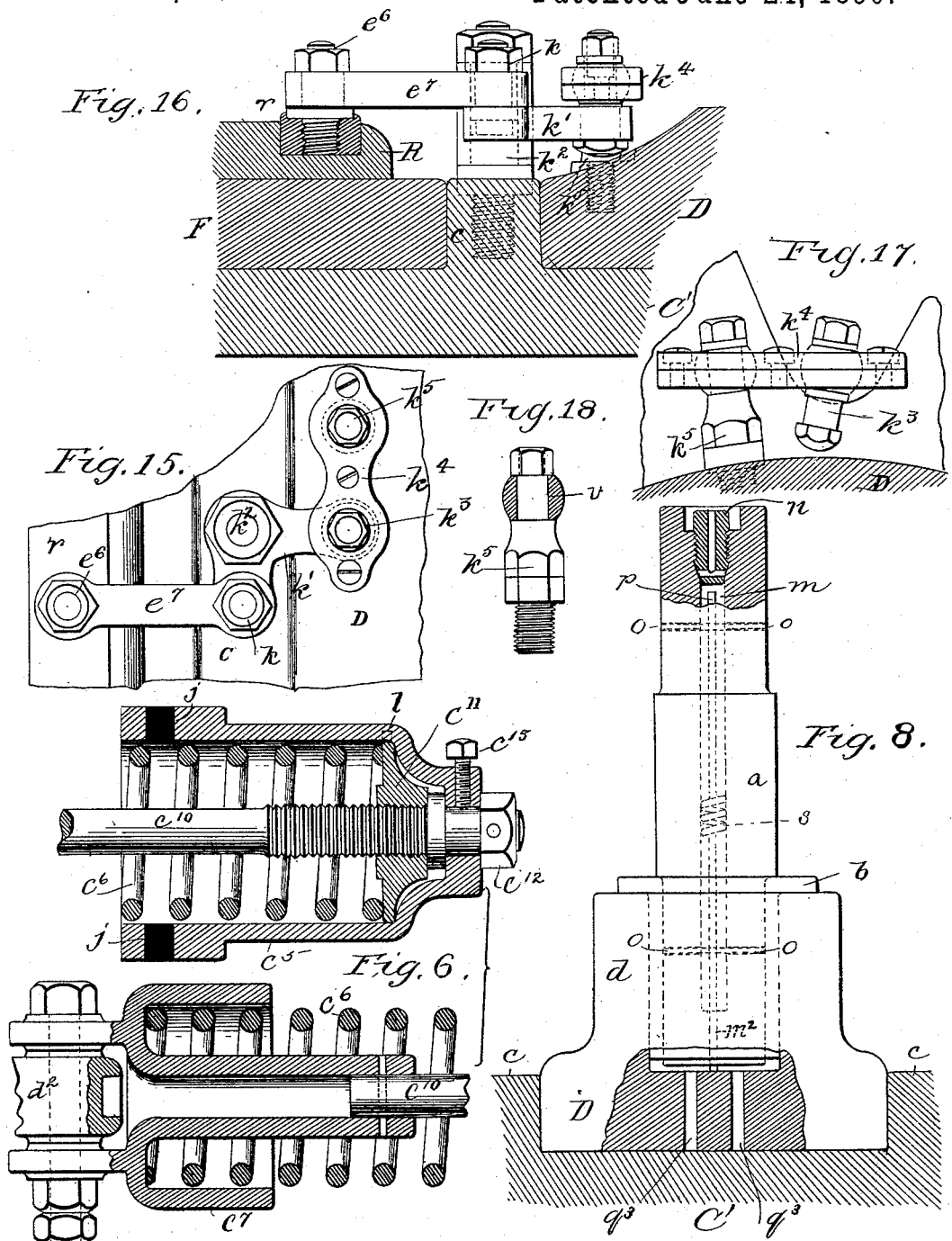
WITNESSES:
INVENTOR
Gabriel Leverich
BY 
ATTORNEY.

(No Model.) 7 Sheets—Sheet 7.
G. LEVERICH.
GEAR FOR DRIVING THE WINDING DRUMS OF CABLE RAILWAYS.
No. 430,660. Patented June 24, 1890.
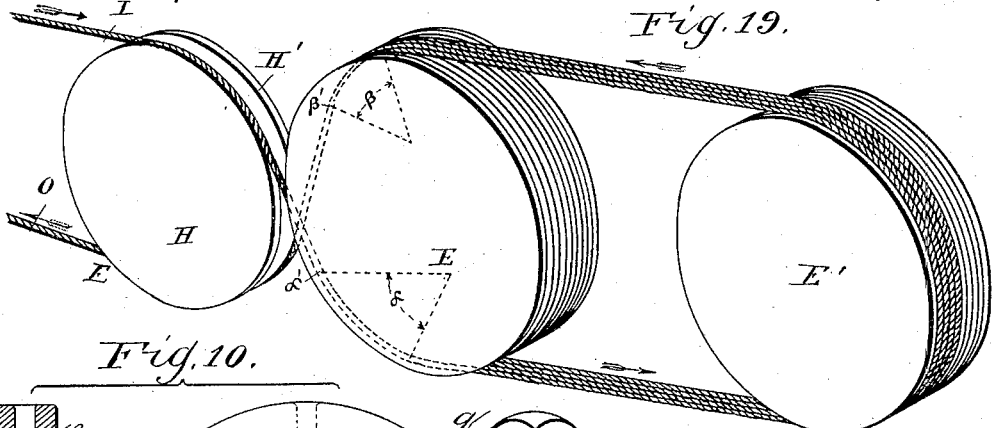
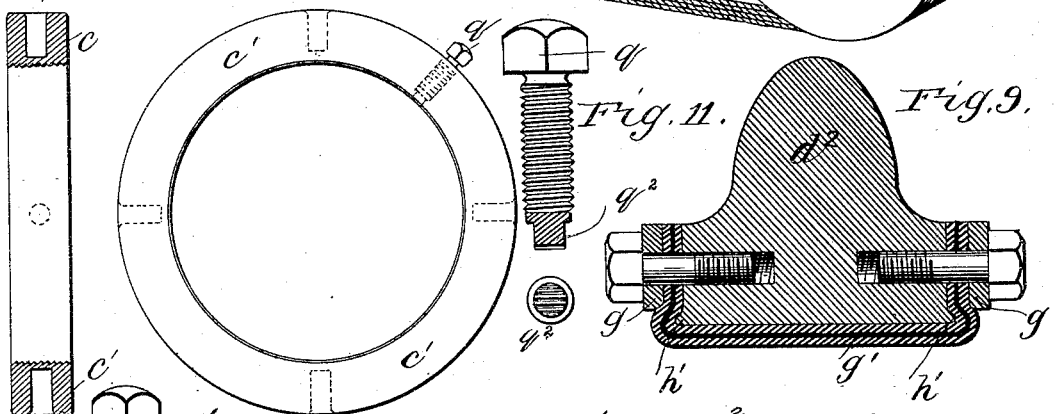
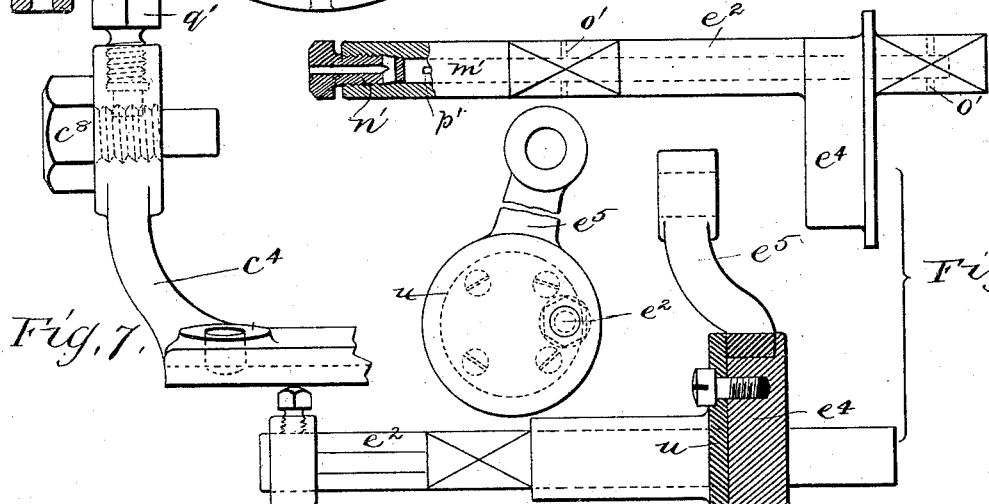
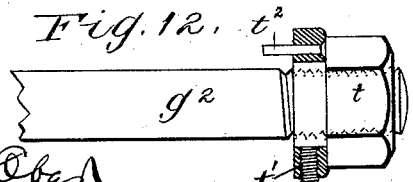
WITNESSES:
INVENTOR
Gabriel Leverich
BY
ATTORNEY.

UNITED STATES PATENT OFFICE.

GABRIEL LEVERICH, OF SOUTH ORANGE, NEW JERSEY.

GEAR FOR DRIVING THE WINDING-DRUMS OF CABLE RAILWAYS.

SPECIFICATION forming part of Letters Patent No. 430,660, dated June 24, 1890.

Application filed January 18, 1890. Serial No. 337,359. (No model.)

*To all whom it may concern:*

Be it known that I, GABRIEL LEVERICH, a citizen of the United States, residing in the township of South Orange, in the county of Essex and State of New Jersey, have invented certain new and useful Improvements in Gear for Driving the Winding-Drums of Cable Railways, of which the following is a specification.

The invention relates to gear for driving the winding-drums of cable railways.

In the power-plant of a railway for the carriage of passengers or freight in cars hauled by an endless cable the power is transmitted to the cable usually by wrapping it several times around a pair of winding-drums, one or both of which are driven by steam or other power. Frequently the imposed loads resulting from the aggregate traffic moved exceed the hauling power of the cable when but one drum is driven, and then the cable slips. To increase this power, of which the frictional contact between the cable and driven drum is a measure, it is therefore desirable to drive both drums. On a railway with different grades and a fluctuating traffic the stresses imposed on the two lines of endless cable— one to and the other from the drums—vary necessarily from a maximum on the incoming line when the traffic is large in one direction and moved upgrade, requiring the greatest power of the driving-engine, to a similar but smaller maximum on the outgoing line, which may exceed the friction of the power-plant when the traffic is large also in one direction and moved downgrade, and then, if no counteracting force is exerted, the speed of the cable and machinery may be dangerously increased. If the cable were strictly non-elastic and did not increase in length under any stress whatever it was subjected to in use, and if the drums were precisely of the same diameter and would remain so, without wear, then there would be no irregular slipping of the cable in the drum-grooves if the drums were both driven by gears or otherwise from the main shaft at the same rotative speed. The cable is more or less elastic, however, and each line necessarily extends or contracts as the stresses borne by it increase or diminish. The resulting changes in length chiefly take place in the part passing around the drums, and in each wrap proportionate to the particular stress it may bear, greater in the first wrap from the incoming or outgoing line, which at the time is under most stress, and decreasing regularly in each wrap from the first; hence, if the two drums are rotated at the same speed there will be more or less creeping of the coiled cable along the drum-grooves, undue wear of each, and consequent loss of power. To remove or greatly alleviate this when both drums are driven, the connecting mechanism, while applying equal power to each, must allow their rotation independently, one faster or slower than the other, as the mean extensions of the several semi-coils of cable in contact with each drum and of the lines between the drums may determine. When the stress on the outgoing cable is greater than the frictional resistance of the entire driving-plant, the remaining aggregate negative load may haul the latter, and its speed and that of the cable may be quickly and largely increased. To prevent this, means are to be provided whereby at such times a resistance or an opposing force shall be automatically applied, varying in degree and sufficient always to maintain the prescribed uniform speed. The resistance may be caused by a friction-brake acting on the winding-drums or other convenient revolving surface by a closed metallic vessel nearly filled with air, which trapped therein is compressed and then allowed to expand by pumping water into and out of the vessel or by throttling the exhaust-steam in the cylinder of the driving-engine sometime before the increasing stress on the outgoing line of cable exceeds the frictional resistance of the plant, and consequently before the live steam entering the cylinder is entirely cut off. By the first method the opposing force is altogether lost. By the two other methods it may be stored up, and afterward when the stress on the incoming line of cable is the greater applied automatically to aid in driving the plant. It is important, however, that the regulations should begin before the speed is increased, and preferably the mechanism therefor is made a part of and operated by the gear herein described. On most cable railways it is important that at all times the traffic shall be handled without interruption and delay, and therefore it is necessary that the driving mechanism may, without stopping and while in use, be surely and efficiently lubricated; also, that when worn parts are to be adjusted or removed, or repairs to be made, such may be done readily and with dispatch. Sometimes it is desirable to stop the drums and cable and to run the remainder of the plant. For this simple and permanent devices should be included in the driving-gear. In winding the cable about the drums the tangent-points or the first and last points of contact, respectively, of the incoming and outgoing line with the first drum may be so located, and thereby the angular extent of the contact therewith of the first and last wrap each determined, that generally under given mean conditions of aggregate loads and of the friction between the cable and the drum-grooves the hauling capacity of the drums will be equal.

The object of this invention is to provide a gear for driving the winding-drums of cable railways and similar machinery, whereby each of a pair of drums shall be driven independently, with equal power and at varying speeds, and may haul nearly or quite equal parts of the aggregate load imposed on the cable. The prescribed uniform speed of the power-plant and cable shall be maintained when the aggregate negative stress on the outgoing line exceeds the frictional resistance of the plant. The drums and cable may be simply connected to or disconnected from the remaining plant, and adjustments, repairs, and renewals of the several parts of the gear may be easily and quickly made.

The following is a description, first, for a gear for driving independently each of a pair of winding-drums, and, second, of a similar gear, in connection with two separate devices, for regulating the speed of the power-plant, as already specified.

Accompanying and a part of this description are the drawings.

Figure 2:
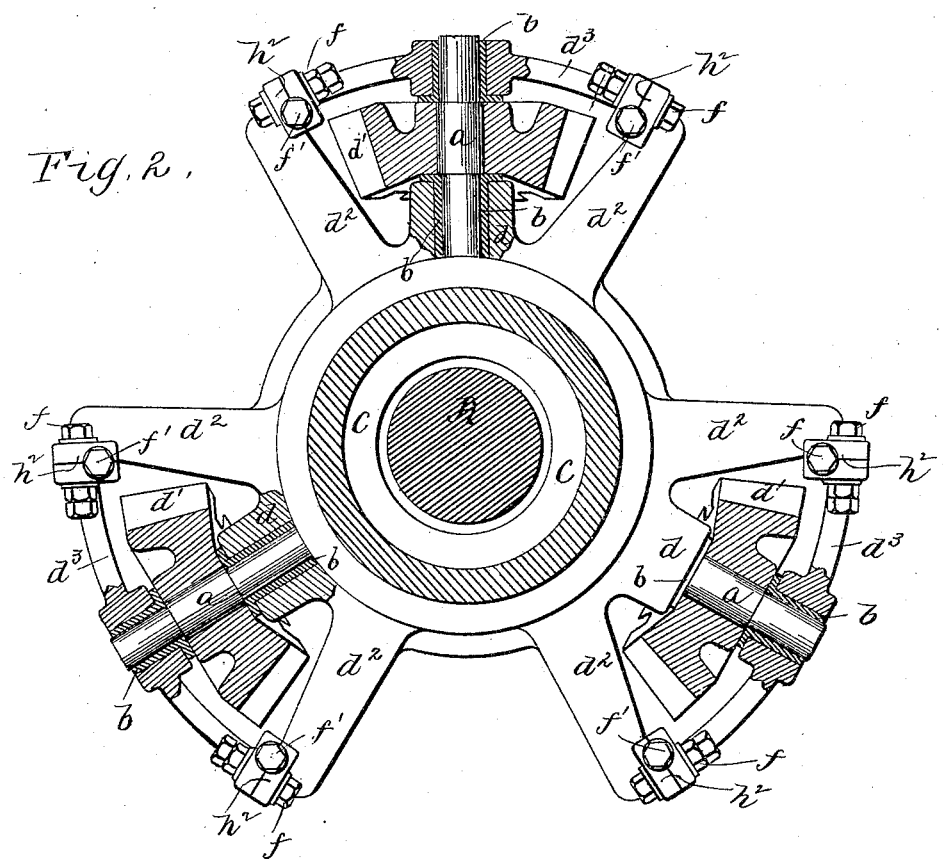

Figures 1 and 2 are longitudinal and transverse sections of the gear simply and without a regulating device. Fig. 3 is a sketch plan of the power-plant, showing the location of the gear and the connection of the regulating device with the driving-engine to be controlled. Fig. 3$^a$ is a detail view of one form of exhaust throttle-valve hereinafter referred to, a portion of the valve-box being represented as broken out. Figs. 4 and 5 are longitudinal and transverse sections of the gear, with one of the two regulating devices. Figs. 6 to 12 are detached views of details of the same, Figs. 6 and 7 being of a resistance-spring and its confining parts; Fig. 8, of a bevel-pinion shaft and its lubricating-fixtures; Fig. 9, of a buffer-cushion in place; Figs. 10 and 11, of a circular nut and its threads in section and of a special set-screw therefor; and Fig. 12, of a bolt and its nut, with a holdfast for the latter. Fig. 13 is a partial view of the gear and the regulating device shown in Figs. 4 and 5. Fig. 14 is a detached view of an eccentric, its shaft, and connecting-rod. Fig. 15 is a plan. Figs. 16 and 17 are elevations, and Fig. 18 is a detached view, of details of a portion of the other regulating device above mentioned; and Fig. 19 is a perspective sketch of a pair of winding-drums and the adjacent deflecting-sheaves, showing winding of the cable.

At B in Fig. 3 are indicated the outlines of steam-engine for the driving-shaft A. Of course any other motor might in some cases be substituted for the steam-engine.

First, the gear simply and without a regulating device. (Shown in Figs. 1 and 2.) Surrounding but not in contact with the main shaft A, and midway between the pair of winding-drums to be driven, is a long sleeve or hollow shaft C. Each shaft runs in its own pillow-blocks, and the two are connected or disconnected by clutches, preferably one at each end of the hollow shaft and closed toward each other. Extending radially outward from the hollow shaft, at equal angular distances apart, are three pairs of arms $d^2$, and on the inside of each arm at the outer end and radial to the shafts is a longitudinal flat pad $h^2$. Joining the two pads of each pair of arms, closely fitted and secured thereto by the transverse bolts $f$ and the longitudinal bolt $f'$, is a segmental strut $d^3$, the axis of the longitudinal bolt being in the surfaces of the pad and strut end in contact. Thereby the strut will be held in place should the transverse bolts fail. In the center of each strut is a boss. A similar boss $d$ is on the outside of the hollow shaft. These two bosses are bored out and fitted with the bushes $b$, of brass or other suitable material, to form the bearings in which one of the three radial shafts $a$, carrying a bevel-pinion $d'$, runs, the axis of each shaft being in a plane through the middle point of and normal to the hollow shaft and at an angular distance between the axes of one hundred and twenty degrees. On the hollow shaft, one on each side of the bosses $d$ and next to the shaft-bearings, are two spur-pinions G, each of which engages with a spur-wheel (see Fig. 3) fixed on the shaft of one of a pair of winding-drums, and thereby drives it. These spur-pinions revolve loosely on the hollow shaft, being kept in position against the shoulders $c$ by the circular nuts $c'$, which screw onto the shaft near the bearings, and are set up for adjustment, as may be necessary from wear of the rotating parts. They are afterward held in place by set-screws. Extending inward from and bolted to each of the spur-pinions is the annular bevel-wheel G', the two wheels engaging on opposite sides with the three bevel-pinions $d'$. In operation the gear so far described will act as follows, the main and hollow shafts being clutched together and driven: With these shafts the bevel-pinions and wheels and the spur-pinions will be carried around without revolving on their bearings so long as the resistances to rotation of the two drums are equal, and the latter will revolve alike and with the driving-shafts. When, however, from the extension or contraction of the several lines of cable around the drums, these resistances tend to become unequal, the pinions and wheels will revolve slightly on their bearings, and the drums will revolve unlike sufficiently to compensate for the mean differences of expansion and contraction of their lines of cable, that drum which otherwise would be most laden rotating as much slower as the other does faster than the driving-shafts. In either case, however, equal power will be transmitted to the two drums.

Second. The gear in connection with a device for regulating the speed of the power-plant. (Shown in Figs. 3 to 14.) Herein the main shaft A, the spur-pinions G, the bevel-wheels G', the bevel-pinions $d'$, with their shafts $a$ and bushes $b$, the segmental struts $d^3$, and the circular nuts $c'$ are the same as above described and shown in Figs. 1 and 2. The hollow shaft C' is, however, divided on the central transverse plane into two like and symmetrical parts. Near the inner end of each part is a circular shoulder $c$, and from this the three curved arms $c^2$ project radially outward at equal angular distances apart. The outer ends of these arms are enlarged and form each the half of a buffer $c^3$. The parts of the hollow shaft are united in one single straight shaft by bolts $i'$ through the buffers and dowel-pins $i$. Between the shoulders $c$ is an annular recess to receive loosely the ring or spider D, which, by means of the three pairs of radial arms $d^2$, their segmental struts $d^3$, their bosses $d$, and bushes $b$, carries the three radial shafts $a$ and their bevel-pinions $d'$ in manner the same as already described. A buffer $c^3$ is between each pair of arms on the outside of each arm, and opposite to the buffer is a pad $d^4$, with a radial longitudinal exterior surface, and on each side of the buffer is a similar surface. The angular distance between the facing-surfaces of the adjoining pads is somewhat greater than that between the corresponding surfaces of the intermediate buffer. Thereby the spider and its attached parts may have a small independent rotation around the hollow shaft limited by the three buffers, each coming into contact with the pad on the driving side $x$ or the driven side $y$. To control this independent movement there are interposed between the buffers and the arms the three regulating-springs $c^6$, each spring inclosed at its ends in a cylindrical pocket $c^5$ or $c^7$, being attached to a buffer by a yoke $c^4$ and trunnions $c^8$ and to an arm by a bolt $c^9$, is jointed at these points of attachment, and by compression acts freely in the central plane transverse to the hollow shaft to oppose the approach of the two abutting surfaces on the side $x$ toward each other.

The partial rotation, faster or slower, of the spider than of the hollow shaft is converted into a lineal reciprocating movement parallel to the shaft-axis and outside of the gear, as follows: Surrounding the elongated hub F of one of the spur-pinions G are the rings R R', one at each side of the arms of the pinion. These rings slide freely along the hub, and are connected together as one piece by bolts $r^2$, which pass through holes therefor in the arms and cause the rings to rotate with the pinion. Around each ring is an external groove, into which the smaller rings $r$ $r'$, each in two parts, bolted together, are fitted. The three guides $r^3$ each project longitudinally from one side of a buffer and pass loosely through a lug on the ring $r$, whereby the latter, though moved longitudinally with ring R, must rotate with the hollow shaft. Rotation of the ring $r'$ is prevented by the two trunnions $r^4$, placed opposite each other, and which, engaging with the forked end of rod S, Fig. 3, by a bell-crank lever S' and a rod $S^2$, communicates an angular reciprocating motion to the lever $S^3$, that operates the exhaust throttle-valve of the driving-engine. This valve may be constructed as shown in Fig. 3$^a$ of the drawings, in which $s^4$ is the valve-box, connected with the exhaust-steam pipe $s^5$ of the engine, and having a damper-valve $s^6$, to the pivotal axis of which the lever $S^3$, above referred to, is secured.

The device for converting the circular motion of the spider D around the hollow shaft C' into a reciprocating longitudinal movement of the rings R and R' is in three parts, each like the other and placed at equal angular distances apart. That shown in Figs. 5, 13, and 14 consists in each part of a radial shaft $e^2$, a bevel-pinion $e'$ on the outer end, and an eccentric $e^4$ near the inner end of this shaft, a segmental rack $e$, which, bolted to a radial arm $d^2$ of the spider, engages with the pinion, a rod $e^5$ at one end looped around the eccentric and the other end taking hold of a stud $e^6$, projecting outward from ring $r$, and a brace $e^3$, that, bolted at its inner end to shoulder $c$ of the hollow shaft, at its outer end forms a second bearing, in which the radial shaft $e^2$ runs. The rack, pinion, and eccentric are so proportioned and located that between the limits of angular movement of the spider around the hollow shaft the eccentric makes one half-revolution and its throw is the extent of the lineal movement of the rings.

A substitute for the device above described is shown in Figs. 15 to 18. It consists of a stud $k^3$, projecting radially outward from the shoulder $c$ of the hollow shaft, on which is jointed a bell-crank lever $k'$. One arm of this lever is connected by a rod $k^4$ with a stud $k^5$, projecting outward from the hub of the spider D, and the other arm, by a rod $e^7$, is connected with the stud $e^6$, before mentioned, on ring $r$. The springs used are proportioned so that when fully compressed the reduction in length is much greater than that caused by the entire movement of the spider around the hollow shaft, and for any particular cable-driving plant are adjusted so that their united effort in opposing this movement transferred to the plant shall not vary much from the frictional resistance of the latter. To provide for this adjustment, each spring and its confining parts are made as shown, Figs. 6 and 7. A spring $c^6$ is held between the front and rear pockets $c^7$ and $c^5$, the front pocket being jointed to a radial arm $d^2$ by two jaws, one on each side of the arm, and a bolt $c^9$, and the rear pocket to a yoke $c^4$, from each side of which a trunion-screw $c^8$ is entered into a hole $j$. Centrally with the pockets and spring is a spindle $c^{10}$, with its front end in a cylindrical guide formed within and a part of the front pocket and its rear end held fast by the closed end of the rear pocket between a collar fixed and a nut $c^{12}$, screwed and pinned on the rod, the arrangement permitting the latter to move longitudinally in the guide, and also when the set-screw $c^{13}$ is slackened to be rotated by a wrench applied to the nut $c^{12}$. On the rod from the collar inward is cut a coarse thread. This takes a nut $c^{11}$, which nearly fills the cavity in the pocket and against which the spring abuts. It is prevented from turning with the rod by a projection on one side held in a slot $l$ along the inner wall of the pocket. To increase or lessen the resistance of the spring to compression within its limits of change in length while in use, the rod is turned in one or the other direction, thus shifting along it the nut $c^{11}$, and thereby making the normal length of the spring in position greater or less. By set-screw $c^{13}$ the rod is prevented from turning after an adjustment is effected.

To prevent undue shock when the buffers $c^3$ bring up on either side against the pads $h$ on the radial arms $d^2$, the abutting surface of each pad is covered by a yielding elastic cushion $g'$, Fig. 9, preferably formed of two thicknesses of leather and a third intermediate thickness of vulcanized india-rubber, the three being firmly cemented together, strained taut over and around the beads $h'$ against the abutting surface, and held in position by the clamps $g$ and two set-screws for each clamp, as shown in Figs. 5 and 9.

The teeth of the wheels and pinions of the gear are made of an involute form, which admits of their running smoothly in close contact and without backlash. To permit adjustment for this or to take up wear and to prevent change in place of the several parts while the gear is operated, special provisions are made. Set-screws $g^3$ are tapped through the rims of the spur-wheels G, whereby, slacking the bolts $g^2$ and turning the set-screws, the bevel-wheels G' may be moved closer to the bevel-pinions $d'$, and then they may be bolted fast in their new position. As the bushes $b$, in which the radial shafts $a$ run, become worn, they may be replaced by new ones closely fitting the journals.

To keep the spur-pinions G up against the shoulders $c$ of the hollow shaft, the circular nuts $c'$, threaded on the latter, may be turned slightly, as required. Each of these nuts, Figs. 10 and 11, is locked fast by the set-screws $q$, and to prevent these from injuring the threads on the hollow shaft a protector $q^2$ for each screw, having on its inner end a continuation of the threads of the circular nut, is put loosely in the hole for the screw, and then the latter turned in upon it, thereby the protector may be forced hard against the shaft-threads without breaking them down. The trunnion-screws $c^8$, Fig. 7, through the yokes $c^4$, forming the jointed connection with the rear pockets for the regulating-springs, are held from turning by the set-screws $q'$. These have similar thread-protectors, as shown.

To prevent the bolts of the gear from working loose, generally double nuts are put on. The nuts $t$ on some bolts, as $g^2$, through the rims of the spur-pinions G and the bevel-wheels G' are each locked by a ring $t'$, Fig. 12, around a short inner cylindrical part of the nut. This ring is kept from turning by a loose pin $t^2$ through it and into the adjacent face of the rim, and a set-screw $t^3$ through the ring, when turned in against the nut, prevents that from working loose.

To confine the loop of rod $e^5$ in the groove around the eccentric $e^4$, Fig. 14, a sleeve $u$ is put on the shaft $e^2$. On the inner end of and a part of this sleeve is an eccentric plate, which forms the removable lip of the groove. The outer end of this sleeve is the shoulder, which, running against the inner side of the outer bearing, with the inner side of the eccentric running against the outer side of the inner bearing, keeps the shaft in place.

Referring to the device for converting the circular motion of the spider around the hollow shaft into a reciprocating longitudinal motion of the rings shown in Figs. 15, 16, and 17, it will be seen that the path of the stud $k^5$, attached to the spider D relatively, is an arc in a plane normal to the plane of movement of the bell-crank lever $k'$. To allow the consequent compound motion at the joints and the easy removal, when necessary, of the rod $k^4$ spherical, and cylindrical connections are made at each of these joints, as shown in operation, Fig. 17, and in detail, Fig. 18. The rod is in two halves screwed together. At each end it is fitted to loosely embrace a sleeve $v$. This sleeve, externally a spherical segment and internally a cylinder, when in position surrounds a cylindrical part of the stud $k^5$ or of the bolt $k^3$.

To lubricate the journals of the radial shafts $a$ and also the bearing of the spider D on the hollow shaft, each radial shaft is bored out, Fig. 8, nearly to its inner end, forming a cylindrical oil-chamber $m$, which is closed at its outer end by a screw-plug $n$, terminating in a cone fitted oil-tight. Through this plug is an oil-passage, first along the axis to the cone and then across, as shown. At the center of each journal are the oil-passages $o$, each on a straight diametrical line across the shaft. There is also a similar passage $m^2$ from the bottom of the chamber on the axis of and to the end of the shaft. On each side of this axis prolonged are the two oil-passages $q^3$ through the hub of the spider to the inner bearing-surfaces. Loosely confined to the center of the chamber by the spiral $s$, wound therein for this purpose, is the wire $p$, of a diameter slightly less than that of the passage $m^2$, through which it extends to the bottom of the bearing $d$. This bearing is in depth somewhat greater than the length of the journal. Thereby an oil-space is left at the inner end of the shaft.

In each of the passages $o$ a straight wire is loosely inserted, the wire $p$ at these points being bent permanently aside to allow a free crossing. These three wires are somewhat shorter than the distances between the confining-surfaces at their ends. The chamber is filled with oil through the plug $n$ by first turning it out slightly and then closed by screwing the plug tight. As each radial shaft $a$ revolves with the driving-shaft in one direction and on its journals in a direction normal to the other, the wire $p$ moves in and out and the wires in the transverse passages $o$ from side to side, and thus feed the oil to the bearings. By a similar arrangement, Fig. 14, the journals of the eccentric-shaft $e^2$ are lubricated. This construction of lubricator I do not claim herein, as the same forms the subject-matter of my application filed May 17, 1890, Serial No. 352,160.

In operation the gear, with a device for regulating the speed of the power-plant, as described, will act as follows: The main and hollow shafts being clutched together and driven in the direction shown by the arrow in Fig. 5, so long as the positive haul on the incoming line of cable together with the frictional resistance of the plant is greater than the united compressive resistances of the regulating-springs, the latter will yield, the abutting surfaces of the buffers and pads on the driving side will remain in contact, and the gear will act the same as that without a device for regulating the speed of the power-plant previously described. When, however, in a change of aggregate load on the cable from one positive on the incoming line to one negative on the outgoing line the positive haul, together with the frictional resistance of the plant, falls below the united compressive resistances of the regulating-springs, they will expand until the two opposing forces are equal or the abutting surfaces of the buffers and pads on the driven side $y$ come into contact, and the spider, with the bevel-pinions, the bevel-wheels, and the spur-pinions together, and without revolution of the bevel-pinions on their bearings, will be rotated around and in advance of the driving-shafts an angular space equal to that between the separated driving abutting surfaces, whereby through the mechanism therefor described an opposing force at the driving-engine or otherwise, as previously referred to, will be applied in degree proportionate to the angular space and to prevent an increase in speed of the power-plant.

The course of the cable around the winding-drum is shown in Fig. 19. Incoming at I, it passes over the deflecting-sheave H and down under the first drum E, thence half-way around the two drums E E' three or four times in succession, and thence, leaving the second drum E', it passes over the first drum, down under the deflecting-sheave H', and out at O. Each drum being driven, its hauling power is limited by the united frictional resistances of the several lines of cable in contact with their grooves around that drum. In each groove this resistance varies with the stress on the line of cable entering that groove and with the arc of contact. Consequently for a maximum stress on the incoming line I or the outgoing line O this resistance will decrease regularly for grooves of equal arc in contact in the numerical order from I to O, or from O to I, and for the same groove as the length of the arc is diminished. It is possible, therefore, the coefficient of the friction to prevent slipping of a cable in a groove being known, to compute the length of the arc $a$ of contact of the first wrap of the incoming line, together with that of the arc $\beta$ of contact of the last wrap of the outgoing line, or, in other words, to locate the respective tangent-points $a'$ $\beta'$ where the cable enters the first and leaves the last groove, and consequently the place the common axis of the deflecting-sheaves H H' referred to the axis of the first drum, so that with general conditions of stress on the incoming and outgoing lines of cable the haul of the two drums shall be equal. This may be done mathematically by constructing an algebraic equation in which the sum of the frictional resistances of the wraps about the first drum is the first member and about the second drum is the second member. The first member will include two terms, each a function of the arc $a$ or of the arc $\beta$, and expressing the frictional resistance of the first or of the last wrap. Hence, by assuming a value for either arc and solving, one of the other arc may be obtained which will satisfy the equation. By such solution it is found that the tangent-points $a'$ $\beta'$ and the axis of the deflecting-sheaves should be not far from a plane through or parallel to the main shaft and through the centers of the axis of the drums, as shown in Fig. 19.

Having thus described my invention, I claim—

1. The combination of a motor, a main shaft, a gear or gears flexibly locked to said shaft, so that under certain conditions the gear or gears will move relative to or independently of the shaft, a system of leverage for transmitting such movement, and controlling mechanism, as a valve, for controlling the motor connected with the system of leverage, whereby the said relative movements will effect a change in the power exerted by the prime mover.

2. The combination of a motor, a main shaft, a sleeve upon and adapted to be clutched to the shaft, a gear or gears flexibly locked to said sleeve, so that under certain conditions the gear or gears will move relative to or independently of the sleeve, a system of leverage for transmitting such movement, and controlling mechanism, as a valve, for controlling the motor connected with the system of leverage, whereby the said relative movements will effect a change in the power exerted by the prime mover.

3. The combination of a motor, a main shaft, a gear or gears flexibly locked to said shaft, so that under certain conditions the gear or gears will move relative to or independently of the shaft, a rack or racks connected with the gear or gears, a pinion engaging said rack and connected with the shaft, an eccentric or crank on the pinion-shaft, controlling mechanism, as a valve, for controlling the motor, and a system of leverage connecting the valve with said eccentric, for the purpose hereinbefore described.

4. The combination of a motor, a main shaft, a sleeve upon and adapted to be clutched to the shaft, a gear or gears flexibly locked to said sleeve, so that under certain conditions the gear or gears will move relative to or independent of the sleeve, a rack or racks connected with the gear or gears, a pinion engaging said rack and connecting with the sleeve, an eccentric or crank on the pinion-shaft, a longitudinally-sliding ring surrounding and rotating with said sleeve, thrust rod or rods connecting the eccentric with the ring, a second ring seated in a groove in the first ring, but having no rotary motion, controlling mechanism, as a valve, for controlling the motor, and a lever or levers connecting the valve with said second ring, substantially as and for the purpose set forth.

5. The combination of a motor, a main shaft, loose sleeves upon said shaft adapted to be clutched thereto, a pair of gears loosely mounted upon said sleeve, a ring also loosely mounted upon said sleeve, said ring being locked to both of the gears, a connection between the ring and the sleeve permitting of a limited amount of lost motion between them, and devices connected with a controlling-valve of the motor, whereby such lost motion will be utilized to operate the valve, and thus control the speed of the engine.

6. The combination of the shaft, a sleeve upon the same adapted to be clutched thereto, two gears mounted loosely upon the sleeve, and a ring also mounted loosely upon the sleeve, locking devices for connecting the two gears and the ring together, and other locking devices connecting the sleeve and ring together, substantially as described.

7. The combination of the shaft, a sleeve upon the same adapted to be clutched thereto, two gears mounted loosely upon the sleeve, a bevel-gear carried by each of said gears, and a ring also mounted loosely upon the sleeve, a pinion or pinions carried by said ring, each of which engages with the beveled gears aforesaid, and locking devices connecting the sleeve and ring together, substantially as described.

8. In a main-shaft driving-gear, the loose ring D, provided with lugs, as $d^2$, to which are attached the sockets for one end of coiled springs, in combination with the sleeve adapted to be clutched to the shaft, provided with lugs, as $c^4$ $c^4$, to which are attached sockets corresponding, respectively, to the socket aforementioned for the opposite ends of said coiled springs, whereby either the movement of the rings or sleeve will be imparted to the other through the springs.

9. In a main-shaft driving-gear, the loose ring D, carrying pinions $d'$ and provided with lugs, as $d^2$, to which are attached sockets for one end of coiled springs, in combination with the sleeve adapted to be clutched to the shaft, carrying gears G G and G' G' and provided with lugs, as $c^4$ $c^4$, to which are attached sockets corresponding, respectively, to the sockets before mentioned for the opposite end of said coiled springs, whereby motion may be imparted from the gears through the ring to the sleeve and from the sleeve through the ring to the gears, substantially as described.

10. The combination of the hollow shaft C', formed in two parts, each part having formed upon it a flange or collar $c$, a ring, as D, encircling the sleeve and being confined between the two flanges $c$ $c$, the sleeves F and F, one arranged on each side of the ring D and upon the hollow shaft C', a gear carried by each sleeve, and locking devices for connecting the ring D and the two sleeves F and F together.

11. In a gear-driving mechanism, the combination of hollow shaft C', provided with curved arms $c^2$ $c^2$, forming buffers $c^3$, and the ring D, provided with lugs $d^2$, carrying corresponding buffers $d^4$, substantially as described.

12. In a gear-driving mechanism, the mechanism herein described for regulating the power exerted by an engine in accordance with the work, which consists of a spring inserted between two elements, to one of which the engine is geared and to the other of which the driven parts are geared, said spring having a resistance below that of the work, in combination with a system of levers connecting one of said elements with the valve of the engine, whereby a movement of the element so connected imparted to it by the said spring will effect a movement of the engine-valve, for the purpose mentioned.

13. A driving-gear consisting of a shaft, a sleeve upon and adapted to be clutched to the shaft, a plurality of pinions mounted loosely upon the sleeve, beveled gears attached to the adjacent faces of the pinions, bevel-pinions mounted upon axles which radiate from the sleeve, said bevel-gears and bevel-pinions intermeshing, whereby the pinions are locked to the shaft and are free to rotate with respect to each other.

14. The combination, with a main shaft, of two pinions thereon, a pair of winding-drums geared, respectively, to the pinions, and means whereby the drums may partake of independently-varying speeds, substantially as described.

15. In a cable-driving plant, the combination, with a main shaft, of a pair of winding-drums, each independently driven by the shaft and over half of each of which the cable is wrapped several times, and a pair of deflecting-sheaves over which the incoming and outgoing cables pass, respectively, to and from one drum, the tangent-points of the incoming and outgoing cables on that drum and the axis of the deflecting-sheaves being located nearly in a plane through or parallel to the main shaft and through the centers of the axis of the drums, whereby the hauling capacity of the two drums will be nearly or quite equal.

16. The mounting of the springs $c^6$, consisting of the two end sockets, in combination with rod $c^{10}$, the adjustable nut $c^{11}$ thereon, and the means for setting up the nut for the purpose of varying the tension of the spring.

17. The combination, with the pinions G and bevel-pinion G', of bolts $g^2$, securing the said pinions together, and set-bolts $g^3$, for setting up the bevel-pinions, for the purpose set forth.

In witness whereof I have hereunto signed my name in the presence of two subscribing witnesses.

GABRIEL LEVERICH.

Witnesses:
WM. A. ROSENBAUM,
THOMAS K. TRENCHARD.